United States Patent Office 3,406,179
Patented Oct. 15, 1968

3,406,179
1-(MERCAPTOACETYL)-2-IMIDAZOLIDONE S-(O,O-DIALKYLPHOSPHOROTHIOATES)
Joel D. Jamison, Wilmington, Del., assignor to Hercules Incorporated, Wilmington, Del., a corporation of Delaware
No Drawing. Filed July 29, 1966, Ser. No. 568,732
6 Claims. (Cl. 260—309.7)

ABSTRACT OF THE DISCLOSURE

The compounds are of the class of mercaptoacetyl-imidazolidone dialkylphosphorothioates, useful as nematocides. A representative compound is 1-(mercaptoacetyl)-2-imidazolidone S-(O,O-diethylphosphorodithioate).

---

This invention relates to nematode toxicants. More particularly, it relates to 1-(mercaptoacetyl)-2-imidazolidone S-(O,O-dialkylphosphorothioates), and to their use as nematocides.

In accordance with the present invention, it has been found that certain 1-(mercaptoacetyl)-2-imidazolidone S-(O,O-dimethyl- and diethylphosphorothioates) are new compounds, each of which exhibits excellent activity when employed as the active ingredient of a nematocidal composition. They are particularly effective for the control of plant-parasitic nematodes in soils infested therewith.

The subject compounds are represented by the following structural formula

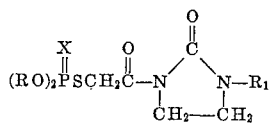

wherein R represents either the methyl or the ethyl radical, $R_1$ represents hydrogen or any one of the methyl, ethyl, isopropyl or acetyl radicals, and X represents either oxygen or sulfur. These compounds may be prepared by any method known in the art; however, the preferred method comprises effecting reaction between the particular 1-chloroacetyl-2-imidazolidone selected and a salt of the appropriate O,O-dialkyl(mono- or di-)thiophosphoric acid in an inert solvent.

Temperatures in the range 0–150° C. may be employed, although the preferred range is 25–80° C. Specific examples of the inert solvents which are suitable for use in this preparative method include ketones, such as acetone, methyl ethyl ketone and higher homologous ketones, alcohols, aromatic solvents, such as benzene and toluene, chlorinated alkanes, for example chloroform and methylene chloride, acetonitrile, ethyl acetate and water. Suitable salts of the O,O-dialkylthiophosphoric acids include the ammonium, potassium, sodium, trialkyl-ammonium and pyridinium salts. The reaction involved is illustrated by the following equation.

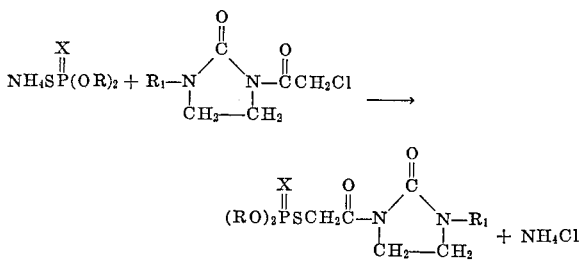

The intermediate 1-chloroacetyl-2-imidazolidone can be prepared by effecting reaction between equimolar amounts of chloroacetyl chloride and the desired imidazolidone in a solvent such as acetonitrile, as is illustrated by the equation below.

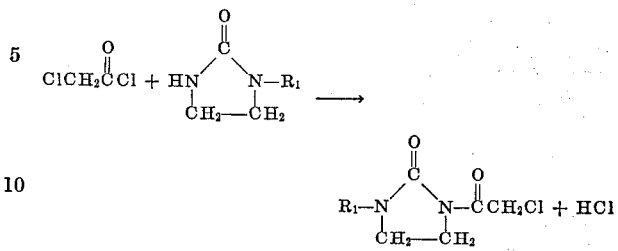

Preparation of the subject compounds and the use thereof as nematode toxicants are illustrated in the following examples. All parts are by weight.

Example I.—Compound 1

Reaction between 105 parts of 1-chloroacetyl-2-imidazolidone and 132 parts of ammonium diethyl dithiophosphate was effected by stirring a mixture thereof in 783 parts of acetonitrile for 18 hours at room temperature, and thereafter heating the reaction mixture at 60° C. for two additional hours. The product was then filtered, concentrated, diluted with about 440 parts of benzene, and washed with sodium bicarbonate (5% aqueous solution) followed by water. After drying of the benzene fraction and removal of solvents 198.7 parts (98% yield) of product, a pale yellow oil which slowly solidified, was obtained. Recrystallization of 25 parts of this crude product, from a toluene-petroleum ether solvent mixture, yielded 22.1 parts of 1-(mercaptoacetyl)-2-imidazolidone S-(O,O-diethylphosphorodithioate), a colorless crystalline solid which melted at 64–66° C. and analyzed 9.10% phosphorous, the theoretical value for phosphorous being 9.87%.

Example II.—Compound 2

Reaction between 16.1 parts of 1-chloroacetyl-2-imidazolidone and 17.5 parts of ammonium dimethyl dithiophosphate in about 157 parts of acetonitrile was effected as in Example I. The reaction mixture was then cooled, filtered and the acetonitrile solvent removed by distillation. Following removal of the acetonitrile solvent, 21.8 parts of 1-(mercaptoacetyl)-2-imidazolidone S-(O,O-dimethylphosphorodithioate), a colorless solid, remained. It melted at 115–122° C. and analyzed 10.6% P and 10.4% N, compared to theoretical values of 10.9% and 9.85% respectively.

Example III.—Compound 3

By a preparative procedure similar to that of Example I, 16.3 parts of 1-chloroacetyl-2-imidazolidone and 20.6 parts of ammonium O,O-diethyl phosphorothioate gave 18.1 parts of an oil which was 1-(mercaptoacetyl)-2-imidazolidone S-(O,O-diethylphosphorothioate) and which analyzed 10.4% phosphorous, the theoretical value for phosphorous being 10.5%.

Example IV.—Compound 4

By a preparative procedure similar to Example I, 10.6 parts of 1-chloroacetyl-3-methyl-2-imidazolidone and 11.5 parts of ammonium O,O-dimethylphosphorodithioate gave 14.6 parts of an oil which was 1-(mercaptoacetyl)-3-methyl-2-imidazolidone S-(O,O-dimethylphosphorodithioate) and which analyzed for 9.1% phosphorous, the theoretical value for phosphorous being 10.4%.

Example V.—Compound 5

By a procedure similar to Example I, 10.6 parts of 1-chloroacetyl-3-methyl-2-imidazolidone and 13.4 parts of ammonium O,O-diethylphosphorodithioate gave 18.5 parts of an oil which was 1-(mercaptoacetyl)-3-methyl- 2-imidazolidone S-(O,O-diethylphosphorodithioate) and which analyzed for 9.2% phosphorous, the theoretical value for phosphorous being 9.5%.

Example VI.—Compound 6

By a procedure similar to those above, 13.4 parts of 1-chloroacetyl-3-ethyl-2-imidazolidone and 15.7 parts of ammonium O,O-diethylphosphorodithioate gave 23.7 parts of an oil which was 1-(mercaptoacetyl)-3-ethyl-2-imidazolidone S-(O,O-diethylphosphorodithioate) and which analyzed for 9.2% phosphorous, the theoretical value for phosphorous being 9.1%.

Example VII.—Compound 7

By a procedure similar to those above, 18.4 parts of 1 - chloroacetyl - 3 - ethyl - 2 - imidazolidone and 19.4 parts of ammonium O,O - diethylphosphorothioate gave 26.3 parts of an oil which was 1 - (mercaptoacetyl) - 3-ethyl - 2 - imidazolidone S - (O,O - diethylphosphorothioate) and which analyzed for 9.0% phosphorous, the theoretical value for phosphorous being 9.7%.

Example VIII.—Compound 8

By a procedure similar to those above, 14.3 parts of 1 - chloroacetyl - 3 - isopropyl - 2 - imidazolidone and 15.7 parts of ammonium O,O - diethylphosphorodithioate gave 24.6 parts of an oil which was 1 - (mercaptoacetyl)-3 - isopropyl - 2 - imidazolidone S - (O,O - diethylphosphorodithioate) and which analyzed for 8.6% phosphorous, the theoretical value for phosphorous being 8.7%.

Example IX.—Compound 9

By a procedure as above, 14.3 parts of 1 - chloroacetyl-3 - isopropyl - 2 - imidazolidone and 14.4 parts of ammonium O,O - diethylphosphorothioate gave 20.5 parts of an oil which was 1 - (mercaptoacetyl) - 3 - isopropyl-2 - imidazolidone S - (O,O - diethylphosphorothioate) and which analyzed for 9.3% phosphorous, the theoretical value for phosphorous being 9.2%.

Example X.—Compound 10

By a procedure similar to Example I, 12.2 parts of 1 - acetyl - 3 - chloroacetyl - 2 - imidazolidone and 14.0 parts of ammonium O,O - diethylphosphorodithioate gave 20.9 parts of an oil which was 1 - acetyl - 3 - (mercaptoacetyl) - 2 - imidazolidone S - (O,O - diethyphosphorodithioate) and which analyzed for 9.5% phosphorous, the theoretical value for phosphorous being 8.8%.

Example XI

To prepare toxicant stock solutions for nematocidal tests, 0.24 part of each of the compounds of Examples I–X was dissolved in four parts of acetone, following which Tween 20 (a sorbitol monolaurate polyoxyethylene derivative) was added in an amount sufficient to yield 400 parts of Tween 20 per million parts of solution. Emulsions were prepared by adding five parts of distilled water to the toxicant concentrates, which emulsions were then diluted with additional distilled water to obtain 234.4 parts of stock. Suitable portions of these emulsions were then further diluted to 125 parts, the amounts of stock taken being such as would give desired rates of application of the toxicants. For example, a 62.5 part fraction of stock diluted to 125 parts would give a rate of application of 52.5 pounds per acre if employed as follows.

One hundred twenty-five parts of a fully diluted emulsion prepared as above was mixed into a quantity of soil sufficient to fill three four-inch diameter pots. This soil was thereafter inoculated with nematodes of the species *Meloidogyne incognita acrita* which were at a desired stage of development, they being, in most cases, second and third stage larvae. The soil was then placed into four-inch pots and watered throughout the test period.

Seven days after treatment of the soil, it was planted with tomato plants. Four weeks later the soil was washed from the plant roots, and the number of knots on the roots of the plants were counted.

In certain instances the above scheme was modified somewhat by inoculating the soil with nematode egg masses of the *Melidogyne incognita acrita* species, instead of second and third stage larvae. To be effective under these conditions, a compound must either possess the ability to penetrate into the egg masses and kill the nematodes in that stage, or have a degree of persistence in the soil sufficient to effectively kill the larvae as they emerge.

The data in the following table indicate the effectiveness of the compounds of this invention at various rates of application to soil inoculated with second and third stage larvae. Also included are data obtained with a commercial nematocide (ethylene dibromide) tested under comparable conditions.

TABLE NO. 1

| Test compound | Rate (pounds/acre) | Damage index | Effectiveness rating | Phytotoxicity (percent) |
|---|---|---|---|---|
| 1 | 26.25 | 0 | AA | 15 |
|   | 13.13 | 0 | AA | 10 |
|   | 6.7 | 0.4 | AA | 0 |
|   | 3.4 | ---- | X | 0 |
| 2 | 20 | 0 | AA | 0 |
|   | 10 | 0.4 | AA | 0 |
|   | 6.7 | 16 | B | 0 |
|   | 5 | ---- | X | 0 |
| 3 | 40 | 0 | AA | 0 |
|   | 20 | 0 | AA | 0 |
|   | 10 | 0.3 | AA | 0 |
|   | 5 | 7.5 | B | 0 |
| 4 | 40 | 0.6 | AA | 0 |
|   | 20 | 2.7 | A | 0 |
|   | 10 | >25 | X | 0 |
| 5 | 40 | 0 | AA | 0 |
|   | 20 | 0.7 | AA | 0 |
|   | 10 | 5.5 | B | 0 |
|   | 5 | 20.5 | B | 0 |
| 6 | 20 | 5.0 | A | 0 |
|   | 10 | >25 | X | 0 |
| 7 | 20 | 0 | AA | 0 |
|   | 10 | 0.16 | AA | 0 |
| 8 | 20 | 0.7 | AA | 0 |
|   | 10 | >25 | X | 0 |
| 9 | 20 | 0 | AA | 20 |
|   | 10 | 1.2 | A | 0 |
| 10 | 40 | 0.5 | AA | 0 |
|   | 20 | 3.2 | A | 0 |
|   | 10 | >25 | X | 0 |
| CH₂BrCH₂Br | 75 | 0.5 | AA | 0 |

The values listed under the heading "Damage Index" (D.I.) in the table above indicate the effectiveness of test compounds at specified application rates against nematode larvae. The D.I. value is the product of 100 times the quotient the average number of knots (from three replicates at each application rate) present on plants placed in treated soil, divided by the average number of root knots which occurred on control plants planted in inoculated, but untreated, soil.

The "Effectiveness Rating" symbol assigned also indicates toxicity to nematode larvae; these symbols are based on D.I. values in accordance with the following criteria: D.I. values in the range 0–1 were rated AA; those in the range 1.1–5 were rated A; those falling within the range 5.1–25 were rated B; and D.I. values of greater than 25 were given the designation X.

The phytotoxicity values presented in Table 1 express the approximate percent reduction from normal size of the roots exposed in the treated soils. While zero reduction is of course preferred, values in these tests ranging up to about 15% are acceptable. In the test procedure used, plantings are effected seven days after soil treatment, whereas in commercial use periods of from ten to fourteen days after treatment and before planting are normal. During such a period the concentration of toxicant in the soil will generally decrease to a point at which the phytotoxic effect of the present toxicants would be negligible, but at which their nematocidal activity remains high.

It has been mentioned previously that in some instances egg masses were substituted for the second and third stage larvae usually used for inoculation. For example, Compound 1 in such a test gave 98+% control at an application rate of 6.5 pounds of toxicant per acre and Compound 2, applied at the rate of 10 pounds per acre, gave 95+% control. These results are comparable to D.I. values of less than 2 and less than 5, respectively.

The compounds of this invention may be made into nematocidal compositions which may be in the form of emulsions, solutions, granules, dusts or wettable powders. The form of the composition depends upon how it will be applied, which in turn depends upon the type of nematode to be controlled and its habitat. Some nematode species inhabit the soil, whereas others will be found on the surface. Accordingly, the species of nematode to be treated may be a factor in determining which form of the composition will be the most beneficial for use.

Several methods of applying nematocidal compositions to nematode-infested soils are employed in practice. When, for example, it is desired to incorporate the nematocidal composition in the soil itself, a liquid formulation, i.e., either a solvent solution or an emulsion, is often found to be the most suitable form. If, however, it is desired to treat the surface of the soil as well, several forms of the composition are acceptable; these include solvent solutions, emulsions, dusts, wettable powders, and granules. All of the above forms are also suitable when it is desired to selectively treat a large area, such as a section of a field of crops.

In the compositions of this invention, the active agent is present in nematocidally effective amounts. The amount of toxicant employed will depend somewhat upon the form of the composition. Generally, however, between about 5 percent to about 95 percent by weight of nematocidally active agent, based on the weight of the total composition, will be used.

Any of the carriers well known in the herbicide and insecticide arts can be employed as carriers for the nematocidally active compounds of this invention. Numerous examples of such carriers are disclosed in Chemistry of the Pesticides by Donald E. H. Frear, third edition, pp. 5–6 (1955).

A preferred form in which the compounds of this invention can be used is as aqueous emulsions. A concentrated composition for dilution to such an emulsion may thus comprise the compound in admixture with an organic solvent and, optionally, a surface-active agent. Organic solvents suitable for use herein include xylene, toluene, isophorone, kerosine, pine oil, and cyclohexanone. The surface-active agents may be any of the well-known organic anionic, cationic, or nonionic surface-active agents commonly used in the pesticide art. Examples of such agents are disclosed in Chemistry of Insecticides, Fungicides and Herbicides by Donald E. H. Frear, second edition, pp. 280–287 (1948).

In addition to aqueous emulsions prepared from emulsifiable concentrates, another preferred composition of this invention is a wettable powder prepared from a solid concentrate. In such a case, a concentrate containing the toxicant, and usually a surfactant, is diluted with a suitably sized solid carrier. The product can be further diluted in the field, with water if a wettable powder is desired, or with additional solid if application is to be in the form of a dust. The liquid concentrates are most often diluted in the field with water and applied as dilute emulsions.

A concentrate of the nematocidal composition of this invention may contain from about 5 percent to about 95 percent of the nematocidally active compound based on the total weight of the concentrate. If it is desired to prepare an aqueous emulsion, then a liquid concentrate of from about 5 percent to about 95 percent of the nematocidally active compound is suitable. If however, the ultimate formulation is to be a wettable powder, then solid concentrates containing from about 5 percent to about 80 percent of the nematocidally active compound are more suitable. If a surface-active agent is employed in the preparation of the concentrates of this invention, it will generally be present in amounts of from about 1 percent to about 10 percent, based on the total weight of the concentrate, preferably from about 3 percent to about 6 percent.

The compounds of this invention may be used as the sole toxic agents in nematocide formulations, or they may be used in admixture with each other and with other toxicants to supplement the properties of the nematocide formulation. Toxicants which may be used in admixture with the compounds of this invention include herbicides, insecticides, fungicides, and other nematocides.

What I claim and desire to protect by Letters Patent is:
1. A compound of the structural formula

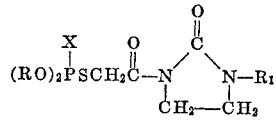

wherein R is selected from the group consisting of methyl and ethyl, $R_1$ is selected from the group consisting of hydrogen, methyl, ethyl, isopropyl and acetyl, and X is selected from the group consisting of oxygen and sulfur.

2. The compound in accordance with claim 1 wherein R is methyl, $R_1$ is hydrogen and X is sulfur.

3. The compound in accordance with claim 1 wherein R is ethyl, $R_1$ is hydrogen and X is sulfur.

4. The compound in accordance with claim 1 in which R is ethyl, $R_1$ is hydrogen and X is oxygen.

5. The compound in accordance with claim 1 in which R is ethyl, $R_1$ is ethyl and X is oxygen.

6. The compound in accordance with claim 1 in which R is ethyl, $R_1$ is isopropyl and X is oxygen.

References Cited

UNITED STATES PATENTS

| 2,928,841 | 3/1960 | McConnell et al. | 260—309.5 |
| 3,183,258 | 5/1965 | Schuler et al. | 260—309.7 |

FOREIGN PATENTS

| 814,587 | 6/1959 | Great Britain. |
| 40/12,620 | 6/1965 | Japan. |

HENRY R. JILES, *Primary Examiner.*

NATALIE TROUSOF, *Assistant Examiner.*